United States Patent [19]

Setbon

[11] 4,402,086

[45] Aug. 30, 1983

[54] SAFETY DEVICE FOR EXTRA-HIGH VOLTAGE GENERATOR, PARTICULARLY AN X-RAY GENERATOR

[75] Inventor: Raoul Setbon, Paris, France

[73] Assignee: Thomson-CSF, Paris, France

[21] Appl. No.: 237,897

[22] Filed: Feb. 25, 1981

[30] Foreign Application Priority Data

Feb. 29, 1980 [FR] France ................................ 80 04603

[51] Int. Cl.[3] ............................................ G03B 41/16

[52] U.S. Cl. .................................. 378/112; 378/105; 378/110

[58] Field of Search .............. 378/105, 106, 108, 110, 378/112

[56] References Cited

U.S. PATENT DOCUMENTS

| | | | |
|---|---|---|---|
| 2,659,016 | 11/1953 | Quittner | 378/112 |
| 3,325,645 | 6/1967 | Splain | 378/112 |

*Primary Examiner*—Craig E. Church

*Attorney, Agent, or Firm*—Oblon, Fisher, Spivak, McClelland & Maier

[57] ABSTRACT

A safety device for an X-ray tube is disclosed which makes it possible to continue the examination which was taking place while a brief blocking of the E.H.V. application occurred which was necessary to bring about rapid stoppage. By this safety device, the rapid automatic rearming takes place so that the interruption was almost negligible in order to provide for stoppage of the examination which was taking place when the tube had repeated starting operations at rapid intervals.

8 Claims, 2 Drawing Figures

SAFETY DEVICE FOR EXTRA-HIGH VOLTAGE GENERATOR, PARTICULARLY AN X-RAY GENERATOR

BACKGROUND OF THE INVENTION

The present invention relates to a safety device for extra-high voltage generators, particularly X-ray generators of the type comprising at least one controllable active element, such as a vacuum tube and with control grids inserted between at least one of the electrodes of the radiogenic tube and at least that of the poles of the extra-high voltage source which is intended to polarize said electrodes. These grid tubes on the one hand serve to act as switches for energizing the radiogenic tube for the exposure period when they are controlled to conduct by a positive square-wave signal applied to their control grids during exposure and on the other hand for applying between the electrodes of the radiogenic tube a voltage determined by the amplitude of said signal obtained by means of a control loop which receives a nominal value voltage preset by the user.

Generators with regulation of the radiogenic tube voltage by means of an electronic grid tube are known, particularly from the following prior art: British Pat. Nos. 689,798 and 689,799 (cf. preamble of claim 1) (U.S. Pat. No. 2,659,016 or German Patent No. 974,342), French Patent No. 1,395,015 (British Patent No. 1,077,742 or U.S. Pat. No. 3,333,104) or German Patent No. 21 16 064. In the case of the two first mentioned documents (i.e. the British and French specifications) it is preferable to use a high-voltage transformer, whose three-phase primary is star or delta connected and whose two three-phase secondaries are star-connected supplying two full-wave rectifiers, whereof one has its negative pole and the other its positive pole connected together to earth, such as, for example, described in German Patent No. 1 029 492, which supplies between its terminals an extra-high voltage (E.H.V.) symmmetrical with respect to earth.

The safety device according to the invention is intended to provide better protection for the patient, the operators and the equipment from the electrical standpoint, on the basis of the new international standards of I.E.C. 601-1. It is also intended to provide adequate radiological protection, i.e. against excessive doses of ionising radiation to the patient in accordance with international standard I.E.C. 407 and the Regulations of the Bureau of Radiological Health of the Food and Drug Administration—21 CFR Sub J 1020. Thus, during the starting of a radiogenic tube it must ensure a rapid cutting off of the E.H.V. supply in order to limit the residual energy passing through the tube to the few Joules stored in the supply cables and in order to make it unnecessary to repeat the complete examination a rapid automatic rearming makes it possible to quickly re-apply the E.H.V. to the radiogenic tube by the control of the grid tubes. This brief cutting off of the E.H.V. supply not only makes it possible to rapidly stop the radiogenic tube, whilst protecting it against high current discharges which can lead to the deposition of metal layers on the inner walls of insulating parts of its tight covering, leading to a reduction in its dielectric strength, the destruction of the filament and/or cracking of the anode, but also protects the generator and its component agaist overvoltages, overcurrents, parasitic oscillations, together with peripheral equipment of the control board and/or the computer supplying signals controlling the operation of the generator in accordance with a predetermined programme in the case of a tomo-scanner (or axial transversal tomographic apparatus assisted by a computer) and which are electrically connected or coupled to the X-ray generator.

Known safety devices used with generators of the aforementioned type are equipped with relays which react, on starting, with a relatively slow response time which can lead to the destruction of the radiogenic tube and the associated components and they interrupt the examination taking place in such a way that the irradiation of the patient has served no useful purpose.

In another generator of this type kenotrons, i.e. high-voltage vacuum diode rectifiers are inserted between the grid tubes and the radiogenic tubes in order to protect it by limiting the current, because their filaments are heated so as to limit the maximum current intensity consumed to a value close to that necessary for exposure in the case of starting the radiogenic tube. This requires two supplementary, highly insulated, heating transformers and elements for regulating the heating current of the kenotrons coupled with that of the radiogenic tube. This limitation of the anode current, without the interruption thereof, during the starting of the tube leads to an increase in the tube stoppage time and also to an increase in the recharging time of the E.H.V. cables following stoppage. This can lead to information losses, particularly in the case of an X-ray scan.

BRIEF SUMMARY OF THE INVENTION

The safety device according to the invention makes it possible to obviate the disadvantages of the prior art devices by permitting, even during repeated starting operations of the radiogenic tube to continue the examination taking place due to the brief blocking of the E.H.V. application so as to bring about rapid stoppage (discharge of the energy in the cables) and rapid automatic rearming (a few tenths of a microsecond after the discharge), thereby making said interruption almost negligible, whilst stopping the examination taking place when the tube has repeated starting processes at rapid intervals.

According to the invention a safety device for an X-ray generator comprising, inserted between at least one of the terminals of a direct current extra-high voltage source and at least one of the electrodes of a radiogenic tube, at least one anode-cathode path of a vacuum tube and with a control grid energized by means of a control circuit supplying it with a square-wave signal, whose duration determines that of the exposure and whose amplitude, which can be regulated by varying a nominal value voltage applied to the input of at least one comparator circuit, determines the voltage drop at the terminals of said path and consequently the supply voltage for the radiogenic tube, is mainly characterized in that at least one measuring resistor for the current in the radiogenic tube, inserted between at least the other terminal of the source and earth, energizes a first analog comparator, whose output becomes saturated (closed) when the voltage drop caused by this current exceeds a predetermined threshold indicating the starting of the tube, so as to control the blocking of the transmission of the grid control square-wave signal by means of an analog gate in order to temporarily block the series vacuum tube and to transmit this square-wave signal again after a time lag determined by the starting current intensity.

According to another feature of the invention the measuring resistor also energizes a first integrating circuit making it possible to integrate voltage drop pulses corresponding to overcurrents due to starting processes which, when they are repeated at brief intervals, increase its integrated output voltage which is applied to a bistable multivibrator tripped by exceeding a predetermined threshold voltage, the output of the bistable multivibrator then controlling the saturation of a switching transistor bringing the nominal value input of the control circuit to earth so as to block at least one grid tube, a so-called second time signal applied by manual control makes it possible to reset the bistable multivibrator, as well as block the switching transistor short-circuiting the nominal value.

BRIEF DESCRIPTION OF THE DRAWINGS

The invention is described in greater detail hereinafter relative to non-limitative embodiments and with reference to the attached drawings, wherein show.

DETAILED DESCRIPTION OF THE PREFERRED EMBODIMENTS

Figure 1:
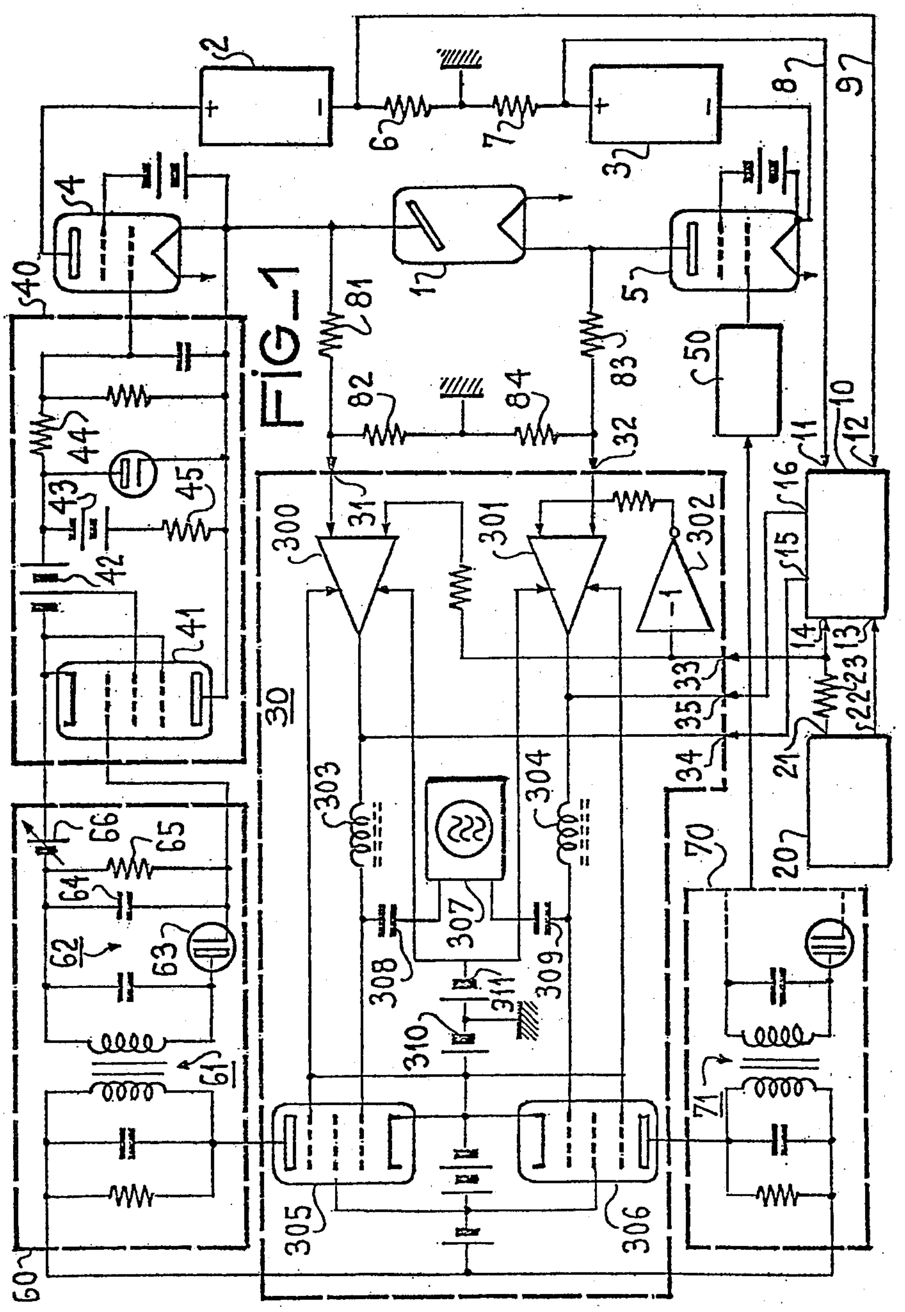
FIG. 1 a part block diagram, part circuit diagram of a conventional X-ray generator incorporating a safety device according to the invention.

In FIG. 1 i is the radiogenic tube energized by two extra-high voltage supply units 2, 3, which are connected in series and supply in each case substantially the same voltage. The two units 2 and 3 can be constituted by two sets of three-phase secondary windings each supplying a set of full-wave rectifiers, whose output terminals are joined by a series connection constituted by a filter capacitor and a resistor (cf. German Patent 1 029 429 and French Patent 1 395 015).

The junction of these two units 2, 3, i.e. that of the negative pole of the first unit 2 and the positive pole of the second unit 3 is connected to earth in such a way that the voltage between the two output terminals (positive poles of unit 2 and negative poles of unit 3) is substantially twice their voltage to earth.

The X-ray generator also comprises, in accordance with the teaching of British Pat. Nos. 689,798 and 689,799 and French Patent No. 1 395 015 a first tetrode 4, whose anode is connected to the positive pole of the first unit 2 and the cathode to the anode of the radiogenic tube 1 and a second tetrode 5, whose anode is connected to the cathode of tube 1 and its cathode to the negative pole of the second unit 3. Tetrodes 4, 5 serve on the one hand to energize the radiogenic tube 1 as an electronic switch and on the other hand to form variable ballast resistors at the terminals of which the anode current of the radiogenic tube passing through them cause voltage drops similar to those at the terminals of regulation resistors, which are cut off from the E.H.V. supplied by the two units 2, 3 in series, so as to vary that between the anode and the cathode of the radiogenic tube 1. These voltage drops are respectively determined by the cathode control grid polarization voltages of tetrodes 4 and 5, which are respectively applied thereto by means of control circuits 40 (indicated diagrammatically) and 50 (indicated by a block), which are identical and whose chassis float and are insulated relative to earth, because they are respectively joined to the cathodes of tetrodes 4, 5, whose potentials fluctuate relative to earth.

The negative terminal of the first unit 2 and the positive terminal of the second unit 3 are respectively joined here to earth by means of two current measuring resistors 6 and 7 of the same value, at the terminals of which the current of the radiogenic tube 1 leads to voltage drops which are symmetrical with respect to earth at zero potential and proportional thereto. These measuring voltage drops are respectively applied to two inputs 11 and 12 of a safety device 10 according to the invention, which will be described in greater detail hereinafter, by means of two conductors 8 and 9.

The true value of the anode-cathode voltage of the radiogenic tube 1 is measured by means of two resistive divider circuits, whereof the first, constituted by two resistors 81, 82 in series, is connected between the anode and earth and whereof the second, constituted by two series resistors 83, 84 is connected between the cathode and earth. The centre of the first divider 81–82 is connected to a first input 31 of a comparator and modulating circuit 30, whereof a second input 32 is connected to the centre of the second divider 83–84. This first input 31 is connected to one of the inputs of a first differential amplifier 300, whose other input receives from a third input 33 connected to the first output 21 of a nominal value generator circuit 20 the positive square-wave nominal value signal, whose regulatable duration determines the exposure time and whose regulatable amplitude determines the anode-cathode voltage of radiogenic tube 1.

The second input 32 of circuit 30 is connected to one of the inputs of a second differential amplifier 301, identical to amplifier 300, whose other input is energized by an analog inverter stage 302 (of polarity) supplying a signal of the same value as that applied at its input, but of opposite polarity. This input of inverter stage 302 is connected to the third input 33, which supplies it with the aforementioned nominal value signal.

It should be noted that amplifiers 300, 301, forming an analog comparator circuit, can be in the form of conventional symmetrical differential amplifiers equipped with vacuum tubes (triodes) or transistors, or by means of linear integrated circuits (operational amplifiers).

The output of the first amplifier 300 is connected by means of a first interference suppressor choke 303 to the control grid of a first high-frequency pentode 305, whose slope is variable as a function of its grid-cathode polarization equipping a first amplitude modulator. In the same way the output of the second amplifier 301 is connected by means of a second interference suppressor choke 304 to the control grid of a second pentode 306 equipping a second amplitude mmodulator. The control grids of pentodes 305 and 306 are respectively coupled to two outputs of a high frequency oscillator 307 (2.2 MHz) via two coupling capacitors 308, 309.

The cathodes of pentodes 305, 306, connected to their suppressor grids, are brought to a positive potential relative to earth by means of a first d.c. voltage source 310, which also supplies the positive supply inputs of amplifiers 300, 301, whose negative supply inputs are supplied by a second source 311, which is symmetrical to earth. In this way the outputs of amplifiers 300, 301 respectively controlling the polarization of the control grids supply them with voltages which can vary between a zero value and at least the cut-off voltage (blocking). When the variation between the true voltage value and the positive amplitude of the nominal value signal, in the absence of which the pentodes 305, 306 must be blocked, is high and negative, the grid potential approaches that of the cathode, whereas when it is positive the grid potential moves towards the cut-off voltage where the slope and consequently the gain of the modulator stage decreases and then, during exposure, is stabilized at a value corresponding to the amplitude of the nominal value signal.

In order to ensure the insulation between comparator circuit 30, the anodes of pentodes 305, 306 are respectively connected to tuned primary windings of two high frequency transformers 61, 71, respectively forming part of the amplitude detector circuits 60, 70. The also tuned secondary windings of transformers 61, 71, which must be well insulated from the primary windings, supply in each case a peak detector circuit 62 constituted by a diode 63 in series with the connection of a capacitor 64 in parallel with a resistor 65, across which is negatively polarized the grid of another amplifying pentode 41, whose anode is connected to the cathode of tetrode 4. This polarization of the control grid is obtained by means of a third variable d.c. voltage source 66, whose positive pole is connected to the cathode of the other pentode 41 and whose negative pole is connected to one of the terminals of resistor 65, whereof the other terminal is connected to the grid thereof.

Direct current voltage is supplied to the other pentode 41 by means of two other d.c. voltage sources 42, 43, which are in series. One of these, 42, is connected by its negative pole to the cathode of the other pentode 41 and by its positive pole to the negative pole of the other source 43, which is also connected to the control grid of tetrode 4 by means of a resistor 44 for the negative polarization of the same.

The positive pole of the other source 43 is connected by a ballast resistor 45 to the junction of the anode of the other pentode 41 with the cathode of tetrode 4. The current passing through the other pentode 41 brings about a voltage drop of opposite polarity to that of the voltage supplied by the other source 43 at the terminals of resistor 45. The polarization of the other pentode 41 is initially adjusted in such a way that it is polarized to the cut-off limit in the absence of a signal detected at the terminals of the parallel connection 64–65. A detected high frequency wave train supplies a substantially square-wave positive signal at the grid of pentode 41, which then conducts an anode current, which is a function of the amplitude of said wave. This anode current leads to a voltage drop at the terminals of resistor 45, which is cut off from the negative polarization voltage supplied by the other source 43, which keeps the tetrode 4 blocked. Tetrode 4 conducts as a result of the increase in its grid-cathode voltage (reduction of its negative polarization) a current which passes through the radiogenic tube 1 and its internal resistance, i.e. the difference from its anode-cathode potential, is a function of the amplitude of the nominal value signal throughout the duration thereof.

In the circuit of FIG. 1, as in the prior art represented more particularly by the two afoementioned British specifications, each tetrode 4, 5 is controlled by a control loop specifically intended for the same as a function of the amplitude of the nominal value signal, in such a way that the cathode potential of the first tetrode 4 and the anode potential of the second tetrode 5 are symmetrical relative to earth.

The safety circuit 10 according to the invention, diagrammatically shown in FIG. 2 and described hereinafter, acts at two different levels in these two control loops during the starting operations of the radiogenic tube 1. When the interval between two or more successive starting operations exceeds an interval predetermined by means of an integrating circuit (time constant), it only acts on the control grids of the pentodes 305, 306 of the modulators, by briefly applying thereto negative voltages beyond the cut-off voltage across outputs 15 and 16, respectively connected by the fourth input 34 and fifth input 35 of circuit 30 to the outputs of amplifiers 300, 301.

During successive, closely spaced starting operations detected by the integration of the signal between inputs 11 and 12, a bistable multivibrator with a threshold controls the earthing of its fourth input/output 14 by an electronic switch preventing the transmission of the nominal value signal to the third input 33 of the comparator and modulator circuit 33 because the first output 21 of the nominal value generator 20 is connected to the fourth input/output 14 via a resistor 23.

Figure 2:
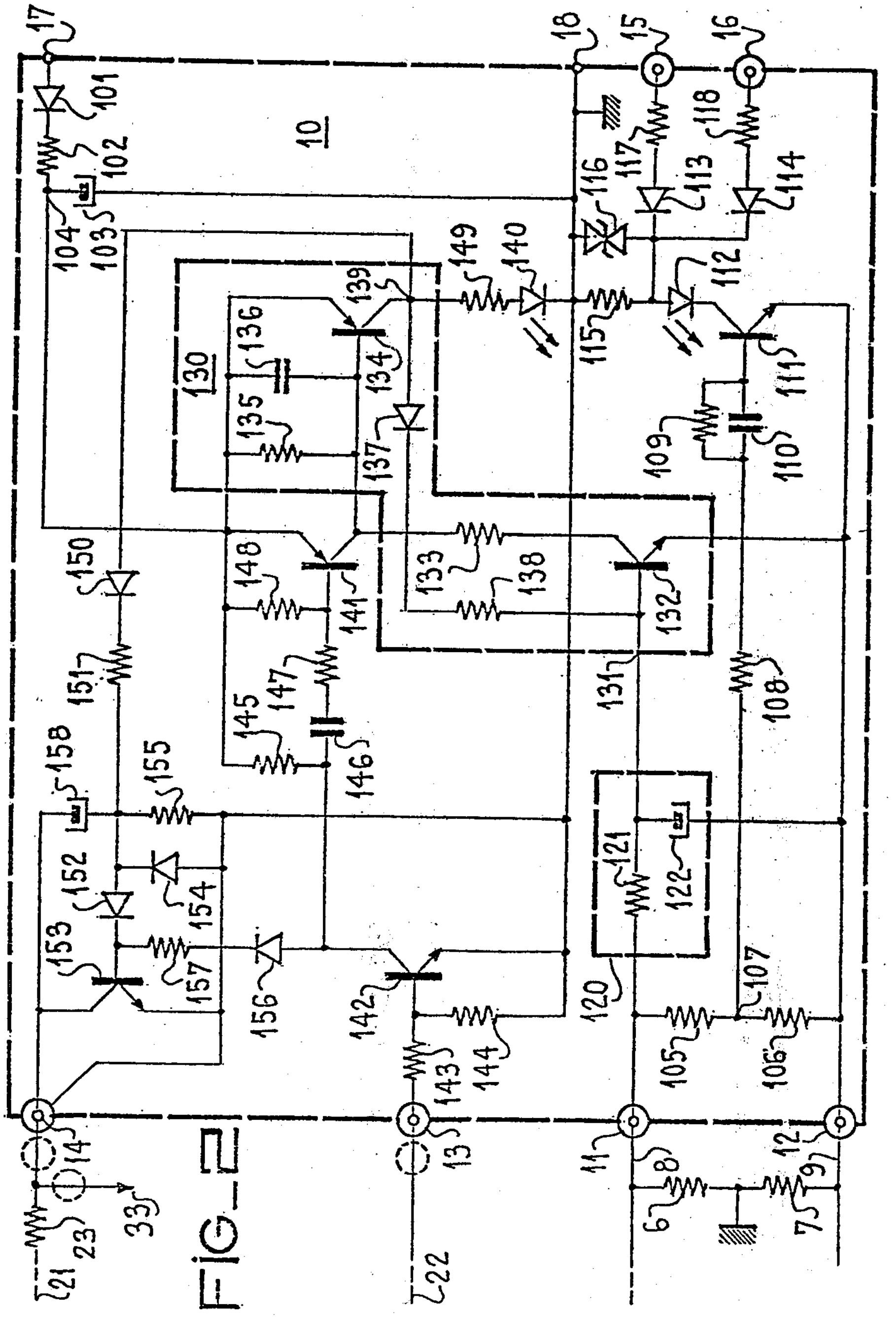
FIG. 2 a circuit diagram of the preferred embodiment of the safety device according to the invention.

FIG. 2 diagrammatically shows one of the preferred embodiments of the safety circuit 10 according to the invention, with its first two signal inputs 11, 12 connected to the respective terminals of the current measuring resistors 6, 7 (approximately 10 ohms) of the X-ray generator circuit, with its third input 13 connected to the second output 22 of the nominal value generator 20 of FIG. 1, which supplies positive square-wave control signals of constant amplitude (+6 V), whose duration is the same as the exposure time, with its fourth input/output 14 connected in parallel with the third input 33 of the comparator and modulator circuit 30 and, across a resistor 23, to the first nominal value output 21 of generator 20 and with its two outputs 15, 16 respectively connected to inputs 34 and 35 of circuit 30.

The safety circuit 10 also has two supply inputs 17, 18, whereof the first, 17, is connected to the positive pole of a d.c. low voltage source (+24 V) and whose second input 18, connected to the chassis earth, is connected to the negative pole thereof. The positive supply input 17 is, for example, connected by means of a first diode 101 and a current limiting resistor 102 (a few dozen ohms) to the positive foil of an electrochemical filter capacitor 103 (a few hundred microfarads), whose negative foil is connected to the negative supply input 18 (earth) in such a way that its positive terminal 104 supplies the supply voltage of one of the components (threshold multivibrator) of circuit 10.

The first two inputs 11 and 12 are interconnected here by means of a resistive voltage divider incorporating two resistors 105, 106 in series (of the same value, e.g. a few dozen ohms), whose centre 107 energizes, via a first resistor 108 (approximately 1 kiloohm) and a parallel connection constituted by a resistor 109 (a few dozen kiloohms) and a coupling capacitor 110 (approximately 1 microfarad), the base of an npn junction transistor 111 (switching transistor), whose emitter is connected to the second input 12. It is also possible to connect one of the terminals of resistor 108 directly to the first input 11 when, during a starting operation, the permitted exceeding of the nominal current is of limited value. The first transistor 111, which is preferably a high voltage switching transistor ($V_{CEX}$=1500 V, $I_{CM}$=5 A) is connected by its collector to the cathode of a first light-emitting diode (LED) 112, whose anode is connected in parallel to the cathode of a second diode 113, to that of a third diode 114, to one of the terminals of a high value resistor 115 and to one of the terminals (anode) of a transient voltage suppressor 116. These transient voltage suppressors are generally Zener or avalanche diodes, having a voltage for which they remain blocked (stand-off voltage), a starting voltage for which they start to conduct and a clamping voltage, which is a function of the current passing through them and which appears at the terminals thereof during a transient voltage and a maximum specified current, such as for example those of type UZS 306 to 327 of the "UNITRODE CORPORATION". The other respective terminals of the resistor 115 and the cathode of the transient voltage suppressor 116 are connected to earth (terminal 18) and the anodes of diodes 113, 114 are respectively connected by two resistors 117, 118 to the outputs 15, 16 of circuit 10.

When the radiogenic tube 1 is started as a result of an e.g. thermal degassing, the current which passes through it suddenly increases and leads to rapid increases to the voltage drops at the terminals of measuring resistors 6, 7, which are respectively applied with positive polarity to input 11 and negative polarity to input 12 of safety circuit 10. The predetermined fraction of the sum of these voltage drops supplied by the centre 107 of divider 105–106 is applied across resistor 108 are parallel connection 109–110 to the base of the first transistor 111, which starts to conduct when this fraction exceeds a threshold of approximately 0.7 V, which corresponds to an anode current of tube 1 which exceeds its nominal current by a chosen percentage. The steepness of the voltage drop between the input terminals 11, 12 of the circuit traverses capacitor 110 so as to rapidly control the saturation of transistor 111. Capacitor 110 is then charged to a voltage proportional to the peak value of the starting current across resistor 108 and the base-emitter junction of transistor 111. As soon as the starting current has stopped increasing, capacitor 111 stops charging and the base current of transistor 111 also stops. The charge accumulated at the terminals of capacitor 110 from then on negatively polarizes the base of transistor 111, whilst slowly discharging across resistor 109.

When transistor 111 is saturated, its collector is brought to a negative potential, $(-V_{12}+V_{CEsat})$, which is proportional to the instantaneous amplitude of the discharge current in the tube and which makes it possible to apply across diode 113, resistor 117, output 15 of circuit 10, input 34 and the first choke coil 33 of circuit 30 of FIG. 1, a negative polarization voltage below the cut-off value for the control grid of the first pentode 305 of the first amplitude modulator. This leads to the blocking of the first diode 63 of the amplitude detector and consequently that of the other amplifying pentode 41, together with that of tetrode 4. This leads to the introduction of the high voltage supply to radiogenic tube 1, which only has to absorb the limited residual energy stored in the high voltage cables to bring about the stoppage thereof.

This same process is simultaneously applied to the second modulator comprising the second pentode 306 (FIG. 1), whose control grid is connected to the collector of the first transistor 111 (FIG. 2) via the third diode 114, resistor 118, output 16 of circuit 10 (FIG. 2), input 35 and the second choke coil 304 of circuit 30 (FIG. 1).

This negative polarization of the base of transistor 111 by means of the voltage at the terminals of capacitor 110, due to the charge accumulated at the beginning of the starting operation of the radiogenic tube 1, makes it possible to rapidly re-charge the high voltage cables without the current necessary for the same being able to bring about the unblocking again of transistor 111 by the increase of the voltage drop at the terminals of resistors 6, 7 due to this re-charge.

The fact that the temporary disconnection of the power supply for radiogenic tube 1 by cutting-out tetrodes 4, 5 and its automatic rearming by means of the circuit according to the invention during discreet or time-spaced starting operations, is relatively short and the retention of the nominal value, make it possible to resume the radiological examination of the patient without any significant loss of information and without the radiation which he has received serving no useful purposes, particularly during an e.g. X-ray scan (international X-ray protection standards and U.S. regulations strictly limit the authorized annual dose). The duration of the temporary disconnection is in particular a function of the maximum discharge current intensity and of the voltage applied to tube 1. Its limitation is due more particularly to the rapid cut-out of tetrodes 4, 5 which insulate the tube from units 2 and 3 incorporating capacitors for filtering the extra-high voltage when an important energy quantity is stored ($\frac{1}{2}$ $CV^2$, in which V is approximately 80 kV).

It is pointed out that the high voltage switching transistor 111 controlling the brief disconnection can be replaced by a comparator with a switch-over threshold obtained by means of linear integrated circuits (operational reaction amplifier) of differential amplifier with a high gain for which a threshold voltage is selected in such a way that it corresponds to a voltage drop at the terminals of resistors 6, 7 caused by slightly exceeding the nominal current in the radiogenic tube 1 (by 20 to 50% for example).

The voltage drop at the opposite terminals of two series resistors 6, 7 caused by the current in radiogenic tube 1 is also applied to an integrating circuit 120 constituted by a resistor 121 and a capacitor 122 connected in series between the first and second input terminals respectively of circuit 10, whose time constant is chosen so as to permit the start of the switch-over from the blocked state to the saturated state of a bistable multivibrator 130, whose input 131 is energized by the output 123 of integrating circuit 120 for two or more successive, closely spaced operations of tube 1, i.e. within a time interval determined by the time constant (e.g. less than a few milliseconds), which indicate a defect in the radiogenic tube 1.

The bistable multivibrator 130 used here has two complementary transistors 132, 133 (cf. e.g. British Pat. No. 1,303,410) which are simultaneously blocked or saturated, because the collectors current of 1 drives the base of the other and vice versa. The first npn transistor 132 of multivibrator 130 is connected by its base to the tripping input 131, which is energized by the output 123 of integrating circuit 120. The collector of the first transistor 132 is connected to one of the terminals of a first resistor 133 (approximately 10 kiloohms), whose other terminal is connected to the base of the second pnp transistor 134 and to one of the terminals of a parallel connection formed by a second resistor 135 (approximately 1 kiloohm) and a low capacitance capacitor 136 (approximately 1 nanofarad), whose other terminal is connected to the emitter of the second transistor 134. The emitter of second transistor 134 is also connected to the positive foil 104 of filter capacitor 103, which energizes multivibrator 130. The collector of the second transistor 134 is connected on the one hand via a third diode 137 and a third resistor 138 to the base of the first transistor 132 in such a way as to supply thereto a current which maintains its saturated state and on the other hand via a fourth resistor 149 and a second light-emitting diode 140 of the signalling type to earth 18.

It should be noted that other types of bistable multivibrators can also be used for this purpose, such as the Schmitt trigger (with threshold) or bistable latching multivibrators of the integrated type. The blocking of the second transistor 134 is controlled here by a third pnp transistor 141, which serves as a resetting switch, whose collector-emitter path joins together the base and emitter of the second transistor 134 and which is normally blocked and controlled on its base by means of a fourth npn transistor 142, mounted in a common emitter. The latter receives at its base positive square-wave signals of constant amplitude (+6 V) and whose duration corresponds to the exposure time, supplied by the second output 22 of the nominal value generator 20 (FIG. 1) across the third input 13 of the safety circuit 10 and a voltage divider comprising a first resistor 143 joining the input 13 to the base of the fourth transistor 142 and a second resistor 144 joining the latter to its emitter, which is connected to earth. The collector of the fourth transistor 142 is connected by means of a resistor-collector 145 to the positive foil 104 of capacitor 103, so as to amplify and reverse the phase of its input pulses, i.e. the collector supplies during the exposure time a subtantially zero level ($V_{CEsat}$) and outside this time positive levels ($V_{CC}=+24$ V).

A differentiating coupling circuit (high path) incorporating a coupling capacitor 146 in series with another resistive voltage divider constituted by two series-resistors 147, 148 is connected between the collector of the fourth transistor 142 and the emitter of the third transistor 141 connected to terminal 104 ($+V_{CC}$), the junction of resistors 147, 148 being connected to the base of the third transistor 141 in such a way that it receives negative pulses with respect to its emitter. The leading front thereof coincides with that of the square-wave signals supplied by output 22 so as to temporarily saturate the third transistor 141 during a short time in order to bring about the resetting of the bistable multivibrator 130 at the start of each exposure.

These square-wave signals are generally initiated by the operator and are called second time signals, indicating the start of a new radiological examination (or a new series thereof), no matter whether or not there has been a disconnection caused by the multivibrator 130 during the previous exposure, in order to make it possible to re-apply the nominal value signal to input 33 of circuit 30 (FIG. 1).

The output 139 of multivibrator 130, i.e. the collector of the second transistor 134, is connected across a fourth diode 150, a resistor and a fifth diode 152 in series, to the base of a fifth transistor 153, whose collector is connected by means of the input/output 14 to the nominal value input 33 of the comparator and modulator circuit 30 (FIG. 1) and via a resistor 23 to the first output 21 of the nominal value generator 20 (FIG. 1) supplying the nominal value signal controlling the energizing of the radiogenic tube 1 (FIG. 1).

The emitter of the fifth transistor 153 is connected to earth, particularly by the sheath (armouring) of the coaxial cable used for transmitting the nominal value signal to the anode of a sixth clamping diode 154 and to one of the terminals of another resistor 155, whose other terminal is connected to the junction of resistor 151, the anode of the fifth diode 152 and the cathode of the sixth diode 154. Resistors 151 and 155 form a voltage divider for the output signal of the multivibrator (varying approximately between 0 and +23 V).

When the multivibrator 130 is in its saturated state, the collector of the second transistor 134 constituting its output 139 supplies a high positive voltage ($V_{CC}-V_{CEsat}=23$ V) which, applied across divider 151–155 to the base of the fifth transistor 153, leads to the saturation thereof. Therefore the input/output 14 is connected to earth in such a way that the nominal value signal now only appears between the terminals of resistor 23 and does not arrive across the nominal value input 33 of circuit 30 of diffential amplifiers 300, 301 (FIG. 1). Each of the components 300, 301 then receives at one of their inputs nominal value voltages substantially equal to zero, i.e. differing widely from the true values. Their outputs then rapidly supply voltages close to their negative supply voltage, which leads to the blocking of the modulators which, in the absence of a nominal value, are polarized to cut-off and consequently tetrodes 4, 5 are cut-off. This general blocking is maintained until rearming is carried out by the operator or the programme of the external computer in the form of a second time signal, which controls the resetting (blocked state) of multivibrator 30 and consequently the blocking of the transistor-switch 153 making it possible to re-apply the nominal value to input 33 (FIG. 1).

According to an improved embodiment of the invention the junction of the input/output 14 and the collector of the fifth transistor 153 is connected to the junction of resistors 151, 155 with the anode of the fifth diode 152 and the cathode of the sixth diode 154 by a capacitor 158, whose capacitance is chosen as a function of the desired modification of the rise time of the nominal value signal.

This capacitor 158, in conjunction with transistor 153, has the effect of transforming the front into a linearly rising ramp relating to the rise of the square-wave, nominal value signal, i.e. of significantly reducing the slope of its rise front, so that the application of the extra-high voltage to the radiogenic tube 1 is carried out more gradually. During the positive transition of the start of the square-wave, nominal value signal, capacitor 158 is charged across resistor 155 by a gradually decreasing current, which brings about an identical voltage drop at the terminals thereof. As a result of this voltage drop the fifth transistor 153 is made conductive and will constitute an initially low internal resistance, which will gradually increase as an inverse function of the charging current of capacitor 158 and in parallel with its load circuit. The charging of capacitor 158 by a linearly decreasing current and the linearly increasing resistance of the collector-emitter path of the fifth transistor 153 forming a variable voltage divider with resistor 23, has the effect that the nominal value signal applied to the input 33 of comparator circuit 30 (FIG. 1) has a substantially linear and gradual rise (limiting the dv/dt to be withstood by the generator components and consequently the overvoltages which can appear at various points thereof).

The fourth transistor 142, which receives a positive square-wave signal throughout the exposure at its base is also connected by its collector to the base of the fifth transistor 153 via a seventh diode 156 and a resistor 157 in series.

At the end of exposure the signal controlling the base of the fourth transistor 142 becomes zero and the latter is blocked. The collector voltage rises to the supply voltage ($+V_{CC}$), which leads to a current passing from terminal 104 across the resistor-collector 145, the seventh diode 156, the base resistor 157 and the base-emitter junction of the fifth transistor 153 to earth, whilst saturating the latter. The latter then makes it possible to discharge capacitor 158 across resistor 155 and its collector-emitter path. The seventh diode 156 makes it possible to insulate the collector from the fourth transistor from the base of the fifth transistor 153, when the constant amplitude square-wave signal coincides with the nominal value signal and saturates the fourth transistor 142.

From what has been stated hereinbefore it is readily apparent that the circuit incorporating the fifth transistor 153 and the capacitor 158 in series with resistor 155 exercises two separate functions, the first being to act as a switch, short-circuiting the intake of the nominal value voltage at the comparator and modulator circuit 30 (FIG. 1) during repeated and closely spaced starting operations of the radiogenic tube 1 detected by means of integrator 120 and the switch-over threshold of the bistable latch-type multivibrator 130. The second function of this circuit is to modify the rise time of the square-wave, nominal value signal as a result of the capacitive coupling between the collector and the base of said transistor 153. The latter, in conjunction with the surrounding circuit then functions as a so-called "MILLER" integrator.

The invention is not limited to the embodiments described and/or represented in the drawings, but extends to all direct and indirect technical equivalents.

It is, for example, possible to replace the circuit of transistor 153 fulfilling two functions by two separate circuits, whereof one would act as an electronic switch controlled by multivibrator 130 and the other would be a known integrator equipped with integrated circuits or transistors, but this would increase the cost of circuit 10.

What is claimed is:

1. In an extra-high voltage generator connected to an X-ray tube for polarizing the electrodes of said X-ray tube into direct current voltages incorporating at least one vacuum tube with control grids inserted by its anode-cathode path between at least one of the positive and/or negative poles of at least one source of said voltage and one of the electrodes of the X-ray tube, the control grid of each vacuum tube being energized by means of a voltage control loop incorporating a square-wave nominal value signal generator supplying a first nominal value signal whose duration corresponds to the exposure time and whose amplitude is a predetermined and regulatable fraction of the desired polarization voltage of the X-ray tube, an analog comparator circuit for comparing said first nominal value signal with a constant fraction of the voltage applied to one of the electrodes of the X-ray tube relative to earth and supplying an error voltage, an amplitude modulator amplifying the wave supplied by an oscillator as a function of said error signal, an amplitude demodulator coupled to said amplitude modulator in an insulating manner by means of a transformer and for the duration of said first nominal value signal supplying a demodulated direct voltage to a control circuit polarizing the grid of the vacuum tube with respect to its cathode; a safety device comprising at least one measuring resistor inserted between the other positive and/or negative terminal of the at least one source and earth and supplying between its terminals a voltage drop proportional to the current in the X-ray tube; a high-speed electronic switching having a threshold receiving said voltage drop and which controls its closure when it exceeds a predetermined threshold value corresponding to exceeding the nominal current in the tube by a predetermined quantity; means for controlling the temporary inhibition of the transmission of the modulated wave to the demodulator in such a way as to bring about the cut-off of the vacuum tubes by the initial polarization of its grid in the absence of demodulated voltage, the disappearance of current in the series-connected vacuum tubes and the X-ray tube leading to the automatic re-opening of the switch and the rapid re-application of the polarization voltage of the X-ray tube, when the variation between the successive exceedings of said threshold is greater than a predetermined time interval.

2. A safety device according to claim 1, wherein said electronic switch is coupled to one of the inputs of the at least one modulator comprising at least one active element in such a way as to polarize the latter beyond its cut-out during the closing of the switch.

3. A safety device according to claim 2, wherein said switch comprises a first high voltage npn switching transistor, whose emitter is connected to the terminal of said measuring resistor which is at a negative potential compared with earth when traversed by the current of the X-ray tube, the other terminal of the resistor being connected to earth, the base of the transistor being coupled to said other terminal via a coupling circuit comprising a resistor connected in series with a connection constituted by another resistor and a capacitor in parallel, so as to rapidly saturate the same as a result of rises and block the same as a result of voltage drops at the terminals of the measuring resistor, and wherein in its saturated state the collector of the transistor is coupled to the control electrode of the modulator in such a way that a voltage blocking its output current is applied thereto.

4. A safety device according to claim 3, wherein said high voltage generator further comprises two extra-high voltage sources connected in series, the first souce being connected by its positive pole to the anode of a first tetrode, whose cathode is connected to the anode of the X-ray tube, and wherein a second tetrode has its anode connected to the cathode of the X-ray tube and the other positive/negative poles are joined together by means of a first and second measuring resistor of equal values and in series, whose junction is connected to earth, the control grids of the two tetrodes being in each case energized by a separate control loop in which the amplitude of said first nominal value signal is respectively compared in absolute value with equal fractions of the anode or cathode voltages of the X-ray tube relative to earth to generate error signals, modulating means for modulating a first and second pentode which modulate respectively said control grids and wherein the emitter of said transistor is connected at the junction of the second measuring resistor with the positive pole of the second source, the coupling circuit supplying its base being connected to the center of a resistive voltage divider connected between the respective junctions of said first and second measuring resistor with the two sources, and in which the collector of the transistor is respectively connected in parallel with the two control grids of the pentodes by two circuits formed in each case by a resistor and a diode in series, for applying thereto negative polarization voltages beyond the cut-off of their anode current.

5. A safety device according to claim 1, which also comprises an integrating circuit energized by the voltage drop at the terminals of said first and second measuring resistors; a bistable latch-type multivibrator, whose output normally supplies a low state and whose switchover by the transition of said output to the high state is obtained by exceeding a predetermined voltage threshold at the output of the integrating circuit, which supplies the control input of the multivibrator; the output of said multivibrator energizing the base of a second npn switching transistor, whose emitter is connected to earth and whose collector is directly connected to the nominal value input and connected via a resistor to the output of the generator supplying the nominal value signal, in such a way that the saturation of said second transistor, controlled by the high state of the output of said multivibrator, inhibits the application of said first nominal value signal to an analog comparator circuit including a pair of differential amplifiers, up to the resetting to the initial state of the multivibrator by means of a second time signal.

6. A safety device according to claim 5, wherein the nominal value generator of the high voltage generator supplies a second positive square-wave signal of constant amplitude and of duration equal to that of the exposure time and in which the multivibrator is provided with a supplementary switching transistor controlling the resetting of multivibrator by short-circuiting by means of its collector-emitter path when it is saturated, the base-emitter junction of the saturated transistor of the multivibrator, so as to block the same, the supplementary transistor being supplied at its base by means of a differentiating circuit receiving the second square-wave signal with the polarity necessary for the unblocking thereof, so as to control for each exposure start the resetting of the multivibrator, as well as the blocking of the other transistor.

7. A safety device according to claims 5 or 6, wherein the output of the multivibrator is connected to the anode of a first diode, whose cathode is connected to one of the terminals of a first resistor and in which the other terminal of the first resistor is connected to the collector of said second transistor by means of a capacitor at its emitter by means of a second resistor and a second diode conducting in the opposite direction from its base-emitter junction mounted in parallel and to the base of said second transistor by means of a third diode conducting in the same direction as its base-emitter junction, in such a way that the voltage drop caused at the terminals of the second resistor by the charging current of the capacitor due to the nominal value voltage rise polarizes said second transistor, so that it conducts with a current decreasing with time in the same way as the charging current of the capacitor, so as to constitute a so-called "MILLER" integrator for the positive transition of the nominal value signal.

8. A safety device according to claim 7, further comprising an inverter stage incorporating a third npn transistor, mounted in a common emitter configuration, which is connected to earth and whose collector is connected by means of a resistor to a positive supply terminal, the third transistor receiving at its base the second positive square-wave signal so as to be saturated throughout the exposure time and blocked outside said time, in which the collector of the third transistor is connected to the anode of a third diode, whose cathode is connected to the base of said second transistor by means of a third resistor, so as to polarize it in such a way that its conduction at the end of each exposure period makes it possible to discharge the capacitor across said third resistor at its collector-emitter path.

* * * * *